(12) United States Patent
Calaio

(10) Patent No.: US 7,106,685 B2
(45) Date of Patent: Sep. 12, 2006

(54) TURNTABLE WITH VERTICALLY ADJUSTABLE PLATTER

(75) Inventor: Salvatore J. Calaio, 1808 Peninsula Dr., Arcata, CA (US) 95521

(73) Assignee: Salvatore J. Calaio, Arcata, CA (US)

( * ) Notice: Subject to any disclaimer, the term of this patent is extended or adjusted under 35 U.S.C. 154(b) by 246 days.

(21) Appl. No.: 10/283,564

(22) Filed: Oct. 29, 2002

(65) Prior Publication Data
US 2004/0081066 A1 Apr. 29, 2004

(51) Int. Cl.
G11B 17/04 (2006.01)
G11B 23/00 (2006.01)

(52) U.S. Cl. ..................................... 369/264
(58) Field of Classification Search ............. 369/256, 369/258, 264, 266
See application file for complete search history.

(56) References Cited

U.S. PATENT DOCUMENTS

| | | | |
|---|---|---|---|
| 3,947,042 A | 3/1976 | Evans | |
| 3,979,127 A | 9/1976 | McDonald | |
| 4,018,447 A | 4/1977 | Short | |
| 4,085,940 A | 4/1978 | Hoshimi | |
| 4,098,512 A | 7/1978 | Takizawa | |
| 4,106,775 A | 8/1978 | Takizawa | |
| 4,108,444 A | 8/1978 | Takizawa | |
| 4,108,445 A | 8/1978 | Takizawa | |
| 4,138,121 A * | 2/1979 | Nakajima et al. | 369/233 |
| 4,170,360 A * | 10/1979 | Ohsawa | 369/181 |
| 4,295,277 A * | 10/1981 | Dennesen et al. | 33/655 |
| 4,325,132 A * | 4/1982 | Kuehn | 369/256 |
| 4,340,957 A * | 7/1982 | Kuehn | 369/256 |
| 4,346,467 A * | 8/1982 | Souther | 369/249.1 |
| 4,439,852 A | 3/1984 | Hughes | |
| 4,455,641 A * | 6/1984 | Sliski | 369/249.1 |

(Continued)

FOREIGN PATENT DOCUMENTS

DE 2653727 B1 * 11/1976

(Continued)

OTHER PUBLICATIONS

Chasin, "A Beginner's Guide to Cartridge Setup", www.audiophilia.com/features/cartridge_setup.htm Sep. 1999.

Primary Examiner—Brian E. Miller

(57) ABSTRACT

A turntable that has a platter that can be vertically positioned so that the VTA between the stylus of the cartridge and the record can be easily adjusted without tweaking or touching the tone arm. The turntable includes a base, a platter, a spindle assembly configured to position the platter above the base, and a spindle adjustment mechanism configured to selectively position the vertical position of the platter with respect to the base. In one embodiment, the spindle adjustment mechanism includes a drive shaft that is configured to engage the spindle assembly and to selectively drive the spindle assembly up or down. As the spindle assembly is moved up and down, the platter moves up and down with respect to the base. In another embodiment, the spindle assembly includes a spindle shaft configured to rotate inside a chamber of the spindle assembly. A bolt which attached to the spindle shaft is configured to move up and down when the spindle shaft is rotated. The platter, which supported by a ball bearing resting on the bolt, moves up and down with the bolt as the spindle shaft is rotated. With either embodiment, a remote control unit or a mechanical crank can be used to move the platter up or down with respect to base to adjust the VTA without touching or tweaking the tone arm.

32 Claims, 4 Drawing Sheets

U.S. PATENT DOCUMENTS 4,628,500 A * 12/1986 Thigpen et al. .......... 369/249.1
5,781,525 A * 7/1998 Neulinger ................ 369/271.1

FOREIGN PATENT DOCUMENTS

| EP | 0185140 | 8/1985 |
| EP | 0615649 | 7/1996 |
| JP | 005990257 | 5/1984 |
| JP | 59090257 A * | 5/1984 |

* cited by examiner

TURNTABLE WITH VERTICALLY ADJUSTABLE PLATTER

BACKGROUND OF THE INVENTION

1. Field of Invention

The present invention relates generally to turntables for playing vinyl records, and more particularly, to a turntable that has a platter that can be vertically positioned so that the Vertical Tracking Angle (VTA) between the cartridge stylus on the tone arm and the record on the platter can be adjusted.

2. Description of the Related Art

For many audiophiles, digitally recorded music on compact discs sounds "processed". In contrast, the vinyl playback of music on a turntable sounds much more natural and enjoyable compared to digital playback systems. Turntables for playing vinyl records have therefore recently enjoyed a resurgence in popularity.

The goal of a vinyl playback system is to extract as faithfully as possible the signal carved into the grooves of a record by the record cutting lathe. If the stylus exactly replicates in three dimensions the path of the cutting lathe, then the extracted signal should be an exact replica of the one cut in the groove. Unfortunately, it is very difficult to set the tone arm and cartridge of the turntable to achieve the exact stylus geometry with respect to the record to match that of the cutting lathe when the groove was cut. As a result, the signal replicated by the stylus as it travels through the groove is not identical to the one cut in the groove.

In an attempt to achieve the best sound, the tone arm and cartridge are typically adjusted or "tweaked" in an attempt to get the stylus to travel through the groove at a geometry as close as possible to that of the cutting lathe. One such adjustment is the tracking weight, which is the downward force applied by the stylus to the record groove. Another adjustment is alignment, which is the positioning of the stylus so that it is parallel with the two sides of the curved path of the groove. The azimuth adjustment is the setting of the cantilever of the cartridge so that it is perpendicular to the groove. Skating is the vector force which tends to draw the tonearm and cartridge toward the center of the record. Unless countered by anti-skating, this force can cause uneven wear on the inner walls of the grooves. Many tonearms therefore include one or more mechanism to adjust the tracking weight, alignment, azimuth and anti-skating respectively.

The Vertical Tracking Angle (VTA), which is defined as the angle of the stylus cantilever relative to the record surface, is another adjustment that can be made to the tone arm. The purpose of a VTA adjustment is to angle the cantilever to match that of the original cutting lathe when the record was cut. Most records are cut by a cutting lathe at an angle ranging from 20 to 24 degrees. The VTA is adjusted by modifying the height of the tone arm relative to record surface on the platter. As the height of the arm is increased, the VTA is increased. As the height is decreased, the VTA is decreased.

A number of difficulties are associated with the setting of the VTA. Foremost, there is no convenient way of knowing what VTA was used when a particular record was cut. To complicate the matter further, the angle of the cantilever on cartridges may vary from manufacturer to manufacturer. Therefore, visibly setting the arm tube of the tone arm to be parallel with the record surface does not necessarily guarantee the proper or ideal VTA.

Many turntable owners experiment with different settings and settle on the VTA that sounds the best for a particular record. Since the VTA cutting angle and the thickness of the vinyl may vary from record to record, the VTA that sounds good for one record may not necessarily sound good for another record. Constant height adjustments of the tone arm may therefore be necessary to achieve the optimal sound from record to record. These constant adjustments, however, are not only bothersome, but they may cause the other adjustments mentioned above to become out of their ideal settings. Obtaining and maintaining the proper VTA and other tone arm adjustments for turntables is therefore very challenging for many audiophiles.

A turntable that has a platter that can be vertically positioned so that the VTA between the stylus of the cartridge and the record can be easily adjusted without tweaking or touching the tone arm is therefore needed.

SUMMARY OF THE INVENTION

The present invention relates to a turntable that has a platter that can be vertically positioned so that the VTA between the stylus of the cartridge and the record can be easily adjusted without tweaking or touching the tone arm. The turntable includes a base, a platter, a spindle assembly configured to position the platter above the base, and a spindle adjustment mechanism configured to selectively position the vertical position of the platter with respect to the base. In one embodiment, the spindle adjustment mechanism includes a drive shaft that is configured to engage the spindle assembly and to selectively drive the spindle assembly up or down. As the spindle assembly is moved up and down, the platter moves up and down with respect to the base. In another embodiment, the spindle assembly includes a spindle shaft configured to rotate inside a chamber of the spindle assembly. A bolt which attached to the spindle shaft is configured to move up and down when the spindle shaft is rotated. The platter, which supported by a ball bearing resting on the bolt, moves up and down with the bolt as the spindle shaft is rotated. With either embodiment, a remote control unit or a mechanical crank can be used to move the platter up or down with respect to base to adjust the VTA without touching or tweaking the tone arm.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

It should be noted that like numbers refer to like elements in the figures.

DETAILED DESCRIPTION OF THE EMBODIMENTS

Figure 1:
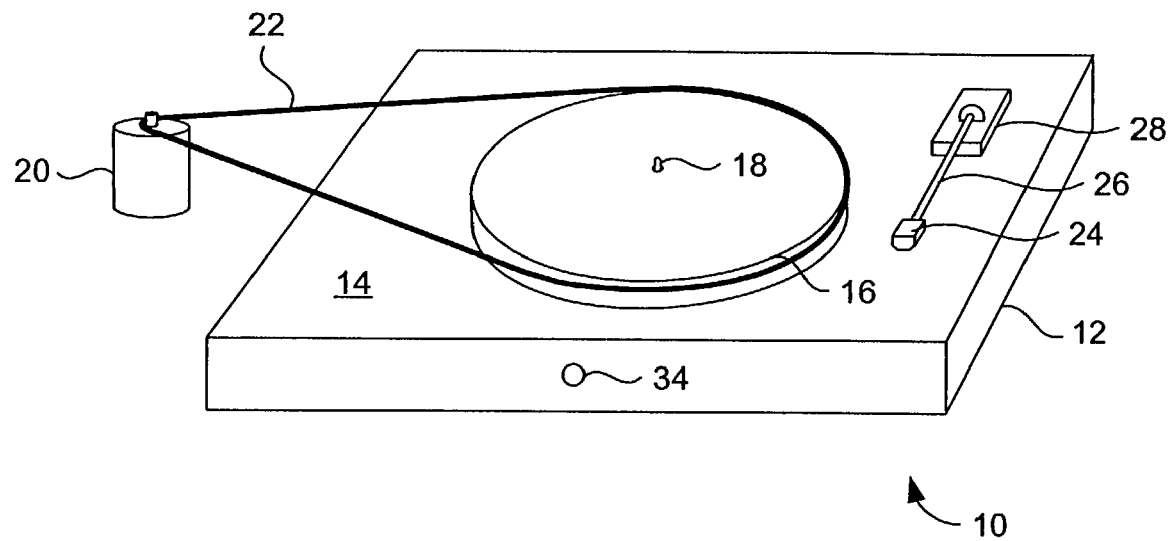
FIG. 1 is diagram of a turntable with a vertically adjustable platter and a remote control unit for controlling the height of the platter according to the present invention.
Figure 1:
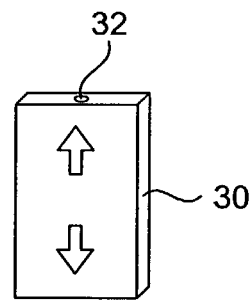

Referring to FIG. 1, a diagram of a turntable with a vertically adjustable platter and a remote control unit for controlling the height of the platter according to the present invention is shown. The turntable 10 includes a base 12, a plinth 14 formed on the top surface of the base 12, a platter 16, a pin 18 to position a record on the platter, a motor 20, a belt 22 wrapped around the platter 16 and the motor 18, a cartridge 24 connected to a tone arm 26 and an arm board 28 to mount the tone arm 26 onto the plinth 14. The motor 20 and belt 22 are configured to rotate the platter 16. According to various embodiments of the invention, the motor is capable of rotating the platter at 33, 45 or 78 revolutions per minute.

The platter 16 is configured to rotate about a spindle (not shown) that is housed within the base 12 underneath the plinth 14. The platter 16 is also configured to be vertically positioned so that the Vertical Tracking Angle (VTA) between the stylus of the cartridge 24 on the tone arm and a record on the platter 16 can be adjusted during play. The platter 16 is vertically adjusted by using a remote control unit 30 according to one embodiment. The remote control unit 30 includes and "Up" arrow and a "Down" arrow which allow a user to move the platter 16 up or down respectively. When one of the arrows is pushed, a signal is transmitted from a transmitter 32 on the remote control on the remote control unit 30 to a receiver 34 on the turntable 34 on the turntable 10. In response to the signal, the spindle housed within the base 12 causes the platter to be positioned either up or down with respect to the plinth 16. Accordingly, the user can adjust or "tweak" the VTA between the record and the stylus of the cartridge to obtain the optimal sound while playing a record. The spindle embodiments of the present invention for vertically positioning the platter 16 within the base 12 are described below.

Figures 2A, 2B:
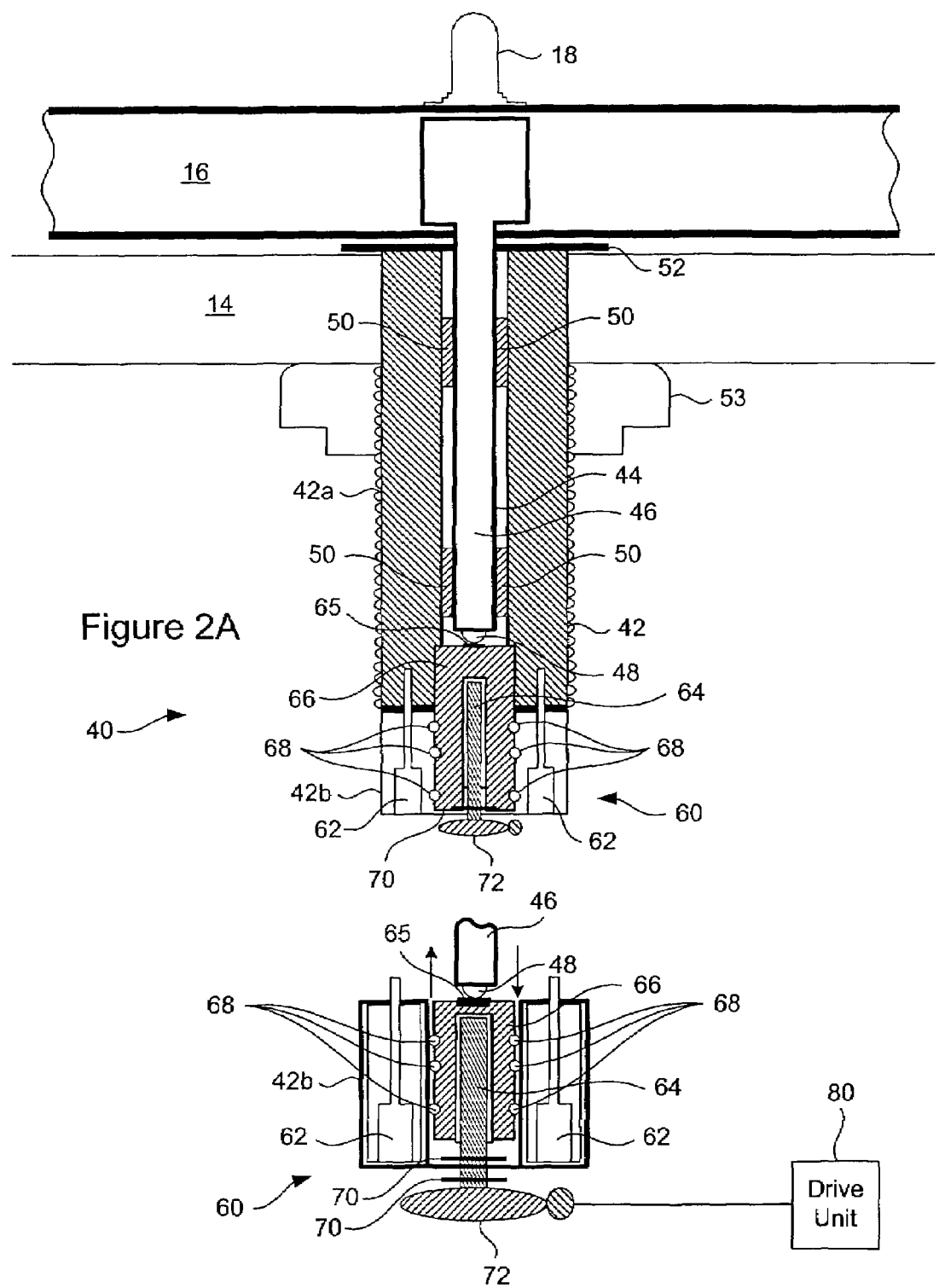
FIGS. 2A and 2B are cross sections of a vertically adjustable spindle used to vertically move the platter up or down according to one embodiment of the present invention.

Referring to FIGS. 2A and 2B, cross sections of a vertically adjustable spindle used to vertically position the platter 16 according to one embodiment of the present invention are shown. The spindle 40 includes a housing 42 including an upper portion 42a and a lower portion 42b, a spindle chamber 44 inside the housing, a spindle shaft 46, and a fixed ball bearing 48 mounted at the bottom of the spindle shaft 46. A plurality of Rulon bearings 50 are provided inside the spindle chamber 44 to allow the spindle shaft 46 to rotate within the upper housing 42a. In alternative embodiments, oilite, brass bushings, ceramic, plastic, or any type of bearing material could be used in place of the Rulon bearings 50. As is evident in FIG. 2A, the upper portion of the spindle housing 42a is designed to be inserted through a recess formed in the plinth 14. A flange 52 is used to hold the spindle 40 in place adjacent the plinth 14. A nut 53 threaded over the upper portion 42a of the housing 42 is used to attach the spindle to the plinth 14. As the platter 16 rotates during operation, the spindle shaft 46 including the ball bearing 48 rotate inside the spindle chamber 44. Similarly, as the spindle shaft 46 is moved up and down inside the spindle chamber 44, the platter 16 is vertically moved up or down with respect to the plinth 14. According to various embodiments of the invention, the spindle 40 including the housing 42 and the shaft 46 are made from hardened stainless steel. In alternative embodiments, these elements may be made from brass, hardened plastics such as Delrin or any other suitable material.

A spindle adjustment mechanism 60 is provided at the bottom portion 42b of the spindle housing. Three pair (only two are shown) of set screws 62 arranged in a ball circle are used to mount the bottom portion 42b including the spindle adjustment mechanism 60 to the top portion 42a of the spindle housing. The spindle adjustment mechanism 60 includes a threaded turning screw 64, and bolt 66 designed to be threaded over the treaded turning screw 64. The bolt 66 fits into a tight bore inside the adjustment mechanism 60. A hardened thrust plate 65 with a machined cavity is formed on the external top plate of the bolt 66. A pair of O-rings or Teflon inserts 68 are provided to position and mechanically isolate the bolt 66 within the housing of the spindle adjustment mechanism 60. A pair of "C" type clips 70 is provided to hold the turning screw 64 in place. A rotation drive unit 72 is provided to turn the turning screw 64. According to various embodiments of the invention, the turning screw 64 is made of stainless steel, brass, or any other suitable material. The bolt 66 is made of stainless steel or brass. The thrust plate 65 is made of Teflon or Carbide. The above listed materials for forming the various elements of the spindle adjustment mechanism 60 are only exemplary. It should be noted that any suitable materials may be used as substitutes for those listed above.

When the set screws 62 are used to attached the spindle adjustment mechanism 60 to the spindle 40, the ball bearing 50 attached to the spindle shaft 46 rests in the machined cavity of the hardened thrust plate 65. When the platter 16 rotates, the spindle shaft 46 and the ball bearing 48 also rotate as one unit on the thrust plate 65. Oil or other lubricant may be used to reduce friction as the ball bearing 48 rotates within machined cavity of the thrust plate 65.

To raise or lower the platter 16, a drive unit 80 (as shown in FIG. 2B only) is used to drive the rotation drive unit 72. In turn, the rotation drive unit 72 rotates the turning screw 64. The rotating turning screw 64 causes the bolt 66 and the thrust plate 65 to move up and down within the lower portion 42b of the spindle adjustment housing. As a result, the platter 16 and the spindle shaft 46 are moved up and down. By controlling the rotation drive unit 72 through the drive unit 80, a user can adjust or tweak the vertical position of the platter 16. The user can therefor adjust the VTA without touching the tone arm 24.

Figure 3:
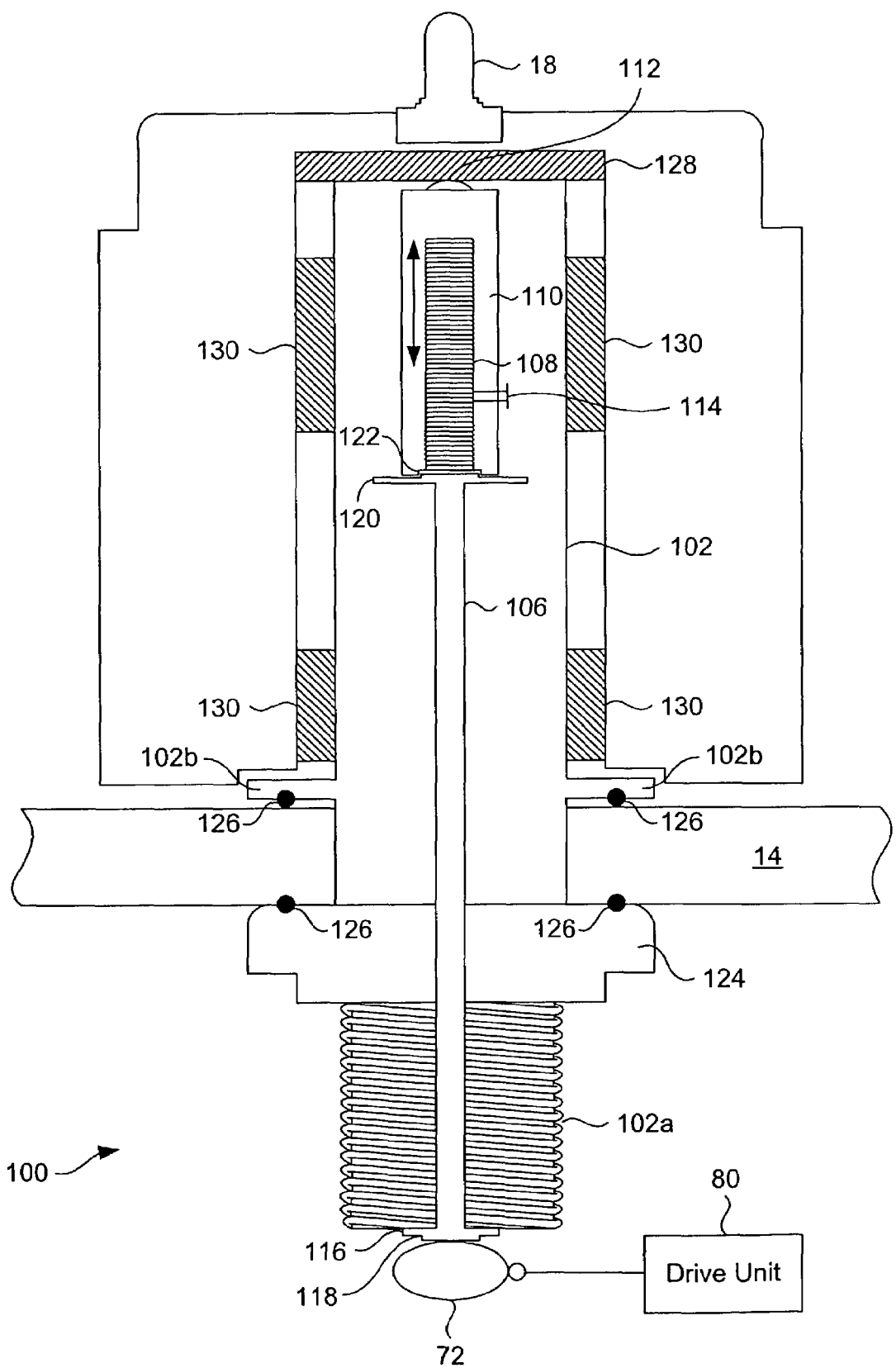
FIG. 3 is a cross section of a vertically adjustable spindle used to vertically move the platter up or down according to another embodiment of the present invention.

Referring to FIG. 3, a cross section of a adjustable spindle used to vertically position the platter 16 of the turntable 10 according to another embodiment of the present invention is shown. The spindle 100 includes a spindle housing 102, a spindle shaft 106 having an upper threaded portion 108, a Rulon bolt 110 configured to rotate around the threaded portion 108 of the spindle shaft 106, and a hardened ball bearing 112 located on top of the Rulon bolt 110. A set screw 114 is used as a position stop for the Rulon nut 110 to prevent it from being turned too far. A washer 116 and E-clip 118 are provided at the bottom portion 102a of the housing 102 to permit the spindle shaft 106 to rotate within the spindle housing 102. The washer 116, however, prevents the spindle shaft 106 from moving up and down within the spindle housing 102 when rotated by the rotation drive unit 72. A washer 120 and a C-clip 122 are also provided on the spindle shaft 106 adjacent the Rulon nut 110.

The turntable of FIG. 3 is assembled by first inserting the threaded, bottom portion 102a of the spindle housing 102 through a recess region formed in the plinth 14. Thereafter, a nut 124 is threaded over the portion 102a of the spindle housing 102 to tightly secure the spindle 100 to the plinth 14. Flanged portions 102b of the spindle housing 102 act to clamp the spindle housing 102 to the plinth 16 when the nut 124 is tightened. Isolators 126, such as rubber O-rings, are provided between the spindle housing 102, the plinth 14 and the nut 124 to substantially isolate the spindle 100 from the plinth 14. Once the spindle housing 102 is attached to the plinth 14, the platter 16 is placed over the top portion of the spindle 100. The platter 16 includes a cavity that is designed to fit over the portion of the spindle housing 102 extending upward from the surface of the plinth 14. A thrust plate 128 is provided within the cavity of the platter 16 beneath the pin 18. When the platter 16 is placed onto the spindle 100, its weight is supported by the thrust plate 128 resting on the ball bearing 112. Bushing 130 are provided between the spindle housing 102 and the cavity within the platter 16. As the platter 16 spins, it rotates about the ball bearing 112. The bushings 130 keep the platter 16 vertically aligned with respect to the spindle 100 so that top surface of the platter provides a flat, horizontal, spinning surface for the record. It is useful to note that since the ball bearing 112 is positioned within the cavity of the platter and is not exposed to any external elements, it may operate without any lubricant and will typically not be exposed to contaminants, such as dirt or dust during normal operation.

To raise or lower the platter 16, a drive unit 80 is used to drive the rotation drive unit 72 to cause the spindle shaft 106 to rotate. The rotating spindle shaft 106 causes the Rulon nut 110 to move up and down within the spindle housing 102. As a result, the platter 16 moves up and down.

A user can therefore adjust the VTA without touching the tone arm 24 by controlling the rotation drive unit 72 through the drive unit 80. According to one embodiment, the spindle 100 is designed to position the platter 16 up or down within a range of approximately one inch. The applicant has found that this range is usually sufficient to "dial in" or find the proper VTA for most records. However, it should be noted, that this range should not be construed as limiting and it is understood that the platter 16 could be adjustable within a larger range or smaller range.

Figure 4A:
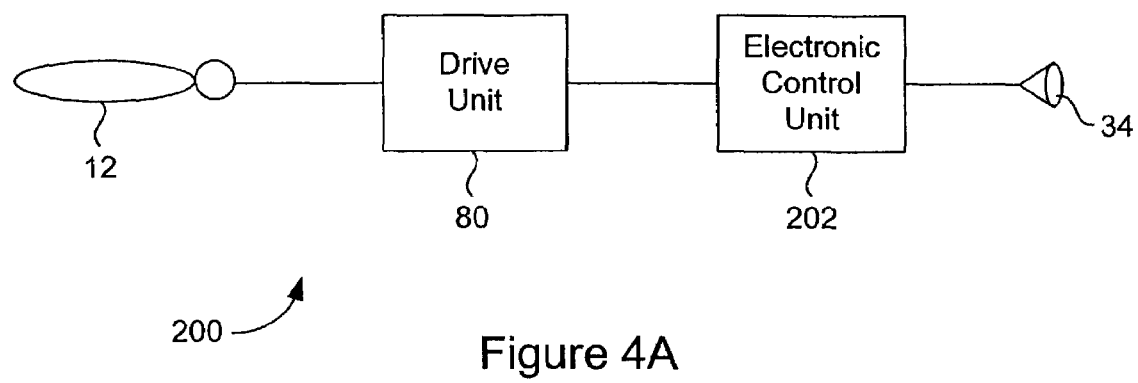
FIGS. 4A and 4B are diagrams of control systems used to vertically adjust the platter of the turntable of the present invention.

Referring to FIG. 4A, a diagram illustrating an electronic control system to control the position of the platter 16 on the turntable 10 is shown. The electronic control system 200 includes the rotation drive unit 72, the drive unit 80, and an electronic control unit 202 coupled to the receiver 34. During operation, the receiver 34 received either an "up" or "down" signal from the transmitter 32 of remote control 34. The received signal is provided to electronic control unit 202. After determining the direction of the received signal, the electronic control unit 202 provides either a drive up or down signal to the drive unit 80. In response, the drive unit 80 generates a control signal used to control the rotation drive unit 72. The rotation drive unit 72 rotates either the turning screw 64 (FIGS. 2A and 2B) or the spindle shaft 106 (FIG. 3) in the appropriate direction to raise or lower the platter 16.

According to various embodiments, the receiver 34 and transmitter 32 are "wireless" and rely on signals transmitted using electromagnetic energy for communication. In one embodiment, infrared signals are used. In alternative embodiments, signals of any wavelength may be used. The electronic control unit 202 may include discrete electrical components, a micro-controller, or a combination thereof. The drive unit 80 can be any electrical device, mechanical device, or a combination thereof, such as a motor.

Figure 4B:
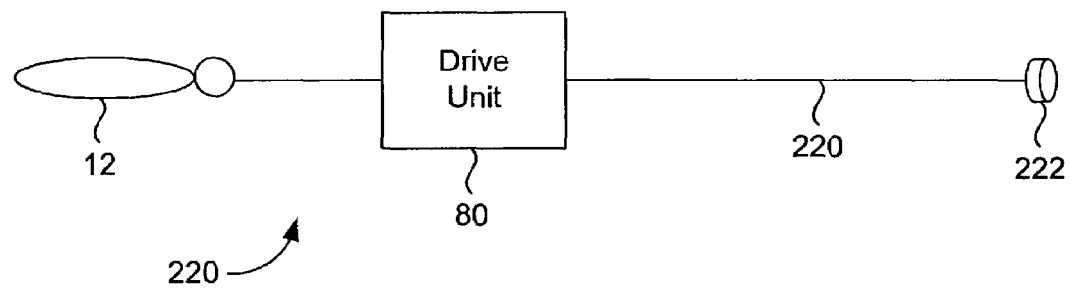

Referring to FIG. 4B, a diagram illustrating a mechanical control system to control the position of the platter 16 on the turntable 10 is shown. The mechanical control system 220 includes a crank 222 coupled to the drive unit 80. When the crank is turned in one direction, it causes the drive unit 80 and rotation drive unit 72 and to move the platter 16 up and down when turned in the opposite direction. According to various embodiments of the invention, the crank 222 can be coupled to a handle, knob or the like 224 located somewhere on the external surface of the turntable 10.

According to various embodiments of the invention, the base can be made of any a variety of materials including but not limited to wood, stone, acrylic plastic or metal, or a combination thereof for example. The base 12 may also use one or more types of isolation techniques to isolate the platter 16 and/or tone arm 26 from mechanical vibrations and/or acoustic energy. For example, the base 12 may be filled with sand or some other dampening material, an air bladder may be used inside the base 12 or underneath the plinth 14, and/or special isolation feet (not shown), with springs or filled with air or oil, may be used to mechanically isolate the turntable 10. Also the platter 16 and/or tone arm 26 can be suspended from the base 12 for further isolation. The platter can also be made of a number of different materials, such as acrylic, a metal such as aluminum, or a dense plastic such as PVC, or a combination thereof. The thickness and weight of the platter 16 may vary. For example, the platter may range from 0.5 to 4.0 inches thick and may weigh from one to fifty pounds. The motor 20 can be any type of motor, for example an alternating current motor, a direct current motor, or a battery powered motor. In the embodiment shown in FIG. 1, the motor 20 is shown separated from the base 12. In alternative embodiments, the motor 20 may be housed inside the base 10. The cartridge 24 may be any type of commonly used cartridge. The tone arm may also be any type of tone arm, for example a uni-pivot, air-bearing, or linear tone arm. Finally, the rotation drive units 72 shown herein could be anyone of a number of devices, such as but not limited to a hydraulic motor, a pneumatic motor, an air bearing, an electronic motor, or beveled gears for example.

Although only a few embodiments of the present invention have been described, it should be understood that the present invention may be embodied in many other specific forms without departing from the spirit or the scope of the present invention. Therefore, the present examples are to be considered as illustrative and not restrictive, and the invention is not to be limited to the details given herein, but may be modified within the scope of the appended claims.

What is claimed is:

1. A turntable, comprising:
    a base;
    a platter positioned over the base;
    a spindle housing provided within the base;
    a spindle shaft and a ball bearing housed within the spindle housing, the spindle housing attached to the platter, the spindle shaft and the ball bearing cooperating to enable the platter to rotate over the base; and
    a spindle shaft adjustment mechanism configured to selectively adjust the spindle shaft within the spindle housing, the spindle shaft adjustment mechanism causing the platter to move up and down relative to the base, while the spindle housing remains stationary relative to the base.

2. The turntable of claim 1, wherein the spindle shaft adjustment mechanism comprises a spindle shaft rotation mechanism configured to selectively rotate the spindle shaft within the spindle housing, the height of the platter relative to the base being adjusted when the spindle shaft rotation mechanism causes the spindle shaft to rotate within the spindle housing.

3. The turntable of claim 1, wherein the ball bearing is attached to a second end of the spindle shaft within the spindle housing.

4. The turntable of claim 3, further comprising a thrust plate positioned adjacent the ball bearing.

5. The turntable of claim 4, wherein the spindle shaft adjustment mechanism further comprising:
   a threaded element;
   a bolt threaded over the threaded element and in contact with the thrust plate, wherein the bolt and thrust plate are moved up or down when the threaded element is turned, causing the spindle shaft to move up or down within the spindle housing.

6. The turntable of claim 5, further comprising a drive unit, coupled to the threaded element, and configured selectively control the height of the platter relative to the base by turning the threaded element.

7. The turntable of claim 6, wherein the drive unit consists of one of the following: a hydraulic motor, a pneumatic motor, an electric motor, an air bearing, or beveled gears.

8. The turntable of claim 7, wherein the drive unit is controlled by a control device, the control device consisting of one of the following: an electronic remote control or a mechanical crank.

9. The turntable of claim 1, wherein the base further comprising a plinth formed on the base and the spindle housing is inserted through a recess formed in the plinth and is mechanically affixed to the plinth.

10. The turntable of claim 1, further configured to accommodate a cartridge and tone arm attached to the base, the spindle shaft adjustment mechanism configured to selectively adjust the vertical tracking angle between the platter and the cartridge by selectively causing the platter to move up and down with respect to the base.

11. A turntable comprising:
   a base;
   a platter;
   a spindle assembly including a spindle shaft connected to the platter and configured to enable the platter to rotate about the spindle shaft;
   a spindle adjustment mechanism that is configured to engage the spindle shaft and to selectively drive the platter up or down with respect to the base, the spindle adjustment mechanism comprising a thrust plate, a bolt, and a threaded element, wherein the threaded element is configured to engage the bolt and cause the bolt and thrust plate to move up and down when the threaded element is rotated, thereby causing the platter to be moved up or down.

12. The turntable of claim 11, further comprising a ball bearing positioned between the spindle shaft and the thrust plate.

13. The turntable of claim 11, wherein the thrust plate comprises carbide.

14. The turntable of claim 11, wherein the spindle assembly comprises a flange which is configured to attach the platter to the spindle assembly.

15. The turntable of claim 14, further comprising an isolation material between the flange and the platter.

16. The turntable of claim 11, wherein the spindle assembly further comprises a spindle housing.

17. The turntable of claim 16, wherein the spindle assembly further comprises at least one bushing, the at least one bushing being configured to position the spindle shaft within the spindle housing.

18. The turntable of claim 17, wherein the at least one bushing comprises one of the following materials: Rulon, oilite, brass, steel, and plastic.

19. The turntable of claim 11, wherein the spindle adjustment mechanism further comprises O-rings to position the bolt within the spindle adjustment mechanism housing.

20. The turntable of claim 11, wherein the bolt is made of one of the following materials: Rulon, plastic, or metal.

21. The turntable of claim 11, further comprising a plurality of bushings between the spindle assembly and the platter.

22. The turntable of claim 11, wherein the spindle assembly includes a spindle housing configured to be bolted to a plinth of the base.

23. The turntable of claim 22, further comprising isolators provided between the plinth and the spindle housing.

24. The turntable of claim 11, further comprising a rotation drive unit coupled to the spindle adjustment mechanism, the rotation drive unit configured to control the spindle adjustment mechanism.

25. The turntable of claim 24, wherein the rotation drive unit comprises one of the following types of rotation drive units: a hydraulic motor, a pneumatic motor, an air bearing, an electronic motor, and beveled gears.

26. The turntable of claim 24, further comprising a remote control unit configured to control the rotation drive unit from a location remote from the turntable.

27. The turntable of claim 26, wherein the remote control unit relies on electromagnetic signals to communicate with the turntable.

28. The turntable of claim 24, further comprising an electronic control unit configured to receive signals from the remote control unit.

29. The turntable of claim 28, further comprising a drive unit configured to drive the rotation drive unit in response to receiving a signal from the electronic control unit.

30. The turntable of claim 24, further comprising a crank to control the rotation drive unit.

31. The turntable of claim 11, further comprising a plinth formed on the base.

32. The turntable of claim 11, further comprising a tone arm with a cartridge and stylus, wherein the tone arm with the cartridge and the stylus is mounted to the base, wherein the vertical tracking angle between the stylus and the platter is adjusted when the the platter is moved up and down.

* * * * *